United States Patent
Kardamitsis-Theofilou et al.

(10) Patent No.: US 12,483,180 B2
(45) Date of Patent: Nov. 25, 2025

(54) COMPENSATION NETWORK

(71) Applicant: Bayerische Motoren Werke Aktiengesellschaft, Munich (DE)

(72) Inventors: Emmanouil Kardamitsis-Theofilou, Munich (DE); Friedrich Schultheiss, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 34 days.

(21) Appl. No.: 18/281,627

(22) PCT Filed: May 2, 2022

(86) PCT No.: PCT/EP2022/061663
§ 371 (c)(1),
(2) Date: Sep. 12, 2023

(87) PCT Pub. No.: WO2022/248163
PCT Pub. Date: Dec. 1, 2022

(65) Prior Publication Data
US 2024/0154564 A1    May 9, 2024

(30) Foreign Application Priority Data
May 25, 2021   (DE) ..................... 10 2021 113 386.6

(51) Int. Cl.
*H02K 11/40*    (2016.01)
*H02P 29/50*    (2016.01)
*H03H 1/00*    (2006.01)

(52) U.S. Cl.
CPC ............... *H02P 29/50* (2016.02); *H03H 1/00* (2013.01); *H03H 2001/0014* (2013.01)

(58) Field of Classification Search
CPC .... H02M 7/5387; H02M 1/123; H02K 11/40; H03H 1/00; H03H 2001/0014; H02P 29/50
(Continued)

(56) References Cited

U.S. PATENT DOCUMENTS

| 9,564,771 B2 * | 2/2017 | Teo ........................ B60L 53/122 |
| 2004/0189115 A1 * | 9/2004 | Preisinger .............. H02K 11/40 |
| | | 310/68 R |

(Continued)

FOREIGN PATENT DOCUMENTS

| DE | 28 44 594 B1 | 1/1980 |
| DE | 10 2004 016 738 B3 | 11/2005 |

(Continued)

OTHER PUBLICATIONS

International Search Report (PCT/ISA/210) issued in PCT Application No. PCT/EP2022/061663 dated Sep. 14, 2022 with English translation (4 pages).

(Continued)

*Primary Examiner* — Gabriel Agared
(74) *Attorney, Agent, or Firm* — Crowell & Moring LLP

(57) ABSTRACT

An electric device for compensating common mode interference in an electric machine includes at least one compensation network with at least one compensation winding and at least one compensation capacitor. The compensation winding and the compensation capacitor are arranged in a series circuit. The at least one compensation winding interacts with at least one stator winding of the electric machine in such a way that a compensation current counteracting the common-mode interference is generated.

18 Claims, 3 Drawing Sheets

(58) Field of Classification Search
USPC .......................................................... 318/508
See application file for complete search history.

(56) References Cited

U.S. PATENT DOCUMENTS

| | | | |
|---|---|---|---|
| 2007/0182357 A1 | 8/2007 | Schrepfer | |
| 2015/0194836 A1* | 7/2015 | Teo ..................... | H02J 7/00712 |
| | | | 320/163 |
| 2016/0308383 A1* | 10/2016 | Teo ....................... | B60L 53/122 |
| 2018/0367025 A1* | 12/2018 | Rasek ................... | H02M 1/126 |

FOREIGN PATENT DOCUMENTS

| | | | | |
|---|---|---|---|---|
| DE | 10 2015 225 095 A1 | 6/2017 | | |
| EP | 1564875 A1 * | 8/2005 | .............. | H02M 1/12 |

OTHER PUBLICATIONS

German-language Written Opinion (PCT/ISA/237) issued in PCT Application No. PCT/EP2022/061663 dated Sep. 14, 2022 with English translation (9 pages).
German-language Search Report issued in German Application No. 10 2021 113 386.6 dated Jun. 22, 2022 with partial English translation (11 pages).

* cited by examiner

COMPENSATION NETWORK

FIELD

The invention relates to an electrical device for compensating for common-mode interference in an electrical machine, to a system and to an electrical machine.

BACKGROUND AND SUMMARY

In electronic devices which comprise switching components such as transistors, for example, the switching operations cause potential differences to occur between electrical conductors, which potential differences then lead to common-mode interference currents through capacitances. FIG. 1 shows a simplified schematic illustration of the origin of common-mode interference. The electrodes of a transistor, in particular the drain electrode 12, or the supply lines of said electrodes are usually electrically insulated from the ground potential 14 of a housing 16 (reference potential). Since the permittivity of the electrical insulation 18 is not infinite, this arrangement constitutes a parasitic capacitance 20. Variations in the potential of the drain electrode 12 of this parasitic capacitance 20 with respect to the ground potential 14 result in the generation of common-mode interference, which has an adverse effect on electromagnetic compatibility. The interference occurs in step with the switching operations of the drain electrode 12. The common-mode interference can occur both for positive and for negative voltage potentials with respect to the ground potential 14. The common-mode interference therefore also has an adverse impact on the operation of components of the electronic device. Due to the common-mode interference, there has to be provision for elaborate and therefore expensive filter elements in order to be able to comply with legal limit values.

The invention is therefore based on the object of compensating for or at least reducing such common-mode interference.

The object is achieved by the subject matter of the present disclosure. Among other things, there is provision for an electrical device for compensating for common-mode interference in an electrical machine, a system and an electrical machine. Advantageous configurations are also specified in the present disclosure. Individual aspects are explained with regard to individual subjects. However, the aspects are mutually transferable as appropriate.

According to a first aspect, there is provision for an electrical device for compensating for common-mode interference in an electrical machine. The device comprises at least one compensation network with at least one compensation winding and one compensation capacitor. The compensation winding and the compensation capacitor are arranged in a series circuit. The at least one compensation winding interacts with at least one stator winding of the electrical machine in such a way that a compensation current counteracting the common-mode interference is generated.

The electrical machine can be coupled to a power converter. The switching operations of switching elements of the power converter can cause the common-mode interference to occur. In order to comply with limit values for electromagnetic compatibility, there may be provision for filter elements coupled to the power converter.

Advantageously, the compensation network can be used to compensate for at least part of the common-mode interference. As a result, electromagnetic compatibility in the electrical machine is improved. Less interference occurs, which is why it is possible to comply with the limit values even using less complex and expensive filter elements. The machine has reduced manufacturing costs overall.

The generated compensation current can have a phase shift of 180° with respect to the common-mode interference. As a result, the compensation current has an amplitude opposite to the common-mode interference. The occurring and unavoidable common-mode interference can therefore be reduced in amplitude or even compensated for.

The compensation network can be passive. This means that the compensation network can exclusively comprise passive electrical components. Passive components are particularly economical. The manufacturing costs of the device are low.

Alternatively or in addition, the at least one compensation winding can have a number of turns that corresponds to the number of turns of the at least one stator winding. This simplifies the design of the compensation network, since then only lower demands are placed on the compensation capacitor in order to be able to design the compensation network in such a way that the common-mode interference is compensated for in terms of amplitude.

The compensation winding can be formed together with the at least one stator winding in the manner of a one-to-one transformer. In the present case, a one-to-one transformer is considered to be a special case of a transformer. The numbers of windings in the one-to-one transformer are identical. The windings in the one-to-one transformer can then be arranged in opposite directions. In addition, the arrangement as a one-to-one transformer allows a reflection of the causative voltage changes, that is to say the voltage rise or drop, to be produced in the compensation network. The one-to-one transformer makes it possible to select the reflection on the basis of the winding direction in such a way that the 180° phase shift can thus be achieved particularly easily.

Alternatively or in addition, the compensation winding can be formed as an additional winding on the at least one stator winding. As a result, the general layout of the electrical machine can be unchanged despite the additional compensation winding.

The electrical machine can have a housing. At least one rotor and a stator of the electrical machine can be arranged in the housing. The compensation network can then be designed in such a way that the compensation capacitor can be arranged inside or outside the housing. Advantageously, the housing can be electrically conductive and be at the ground potential.

The compensation capacitor can also act as a high-pass filter. High-frequency signals can thus pass through it. Low-frequency signals are blocked by it, however.

Alternatively or in addition, the compensation capacitor and the compensation winding can be designed and configured in such a way that the product of the capacitance of the compensation capacitor and the inductance of the compensation winding is equal to the product of the inductance of the at least one stator winding and a parasitic capacitance that is the cause of the common-mode interference for which there is at least partial compensation. If this condition is met, the common-mode interference is advantageously completely compensated for in terms of phase and amplitude, insofar as edge effects such as contact resistances or the like are ignored.

According to a second aspect, there is provision for a system composed of electrical devices for an n-phase electrical machine. The electrical machine comprises at least one stator winding assigned to a respective current phase. The system comprises at least n electrical devices of the type described above. At least one stator winding assigned to a respective current phase interacts with each of the n electrical devices. The electrical machine can be coupled to a power converter. Each of the n current phases of the electrical machine is thus then advantageously provided with an electrical device having a compensation network. It is then possible to compensate for the common-mode interference for all n current phases of the electrical machine, therefore. As a result, a power converter coupled to the current phases of the electrical machine can advantageously be operated in a manner free from common-mode interference. In this way, it is possible to reduce the demands on the filter elements which would otherwise need to be provided, in order to comply with the provisions on electromagnetic compatibility.

The system can further have an intermediate circuit capacitor for the electrical machine. The current phases of the electrical machine can be coupled at a star point. The star point can then be electrically coupled to a center point of the intermediate circuit capacitor. The intermediate circuit capacitor can have at least two capacitor elements for this purpose. As a result, there is provision for the possibility of compensating for the common-mode interference from the whole group of the n current phases.

The electrical machine can be a 3m-phase electrical machine, m being a natural number greater than 0. Accordingly, the number of current phases can be an integer multiple of 3. This is consistent with the typical design of modern electrical machines.

All of the features explained in regard to the second aspect can be transferred, individually or in combination, to the first aspect.

According to a third aspect, there is provision for an electrical machine for an at least partly electrically driven vehicle. The electrical machine comprises a system of the type described above. The electrical machine is coupled to a power converter.

The electrical machine can be configured in the manner of a synchronous machine.

The electrical machine comprises a rotor which is designed to be rotatable about an axis of rotation and has at least one separately excited rotor winding.

The electrical machine also comprises at least one stator having at least one set of stator windings. The set of stator windings has at least n stator windings.

All of the features explained in regard to the third aspect can be transferred, individually or in combination, to the first and/or second aspect. The system can thus also comprise at least n compensation networks, an electrical machine and a power converter.

In particular, there is also provision for an at least partly electrically driven vehicle which comprises an electrical machine as described above.

Within the meaning of the present invention, at least partly electrically driven vehicles may in particular comprise land vehicles, namely, among others, electric scooters, two-wheeled vehicles, motorcycles, three-wheeled vehicles, trikes, quad bikes, off-road and road vehicles such as passenger cars, buses, trucks and other commercial vehicles, rail vehicles (trains), but also watercraft (boats) and aircraft such as helicopters, multicopters, propeller aircraft and jet aircraft, which have at least one electric motor to propel the vehicle. Vehicles may be manned or unmanned. Hybrid electric vehicles (HEVs), plug-in hybrids (PHEVs) and fuel cell vehicles (FCHVs) may also be comprised in addition to pure electric vehicles (BEVs).

All of the features explained in regard to the fourth aspect can be transferred, individually or in combination, to the first and/or second and/or third aspect.

The invention and further advantageous embodiments and developments of the same are explained and described in more detail below on the basis of the examples illustrated in the drawings. According to the invention, the features that can be gathered from the description and the drawings can be applied individually by themselves or collectively in any desired combination.

DETAILED DESCRIPTION

The present disclosure is described below on the basis of exemplary embodiments which merely serve as examples and are not intended to restrict the scope of the present property right.

Figure 1:
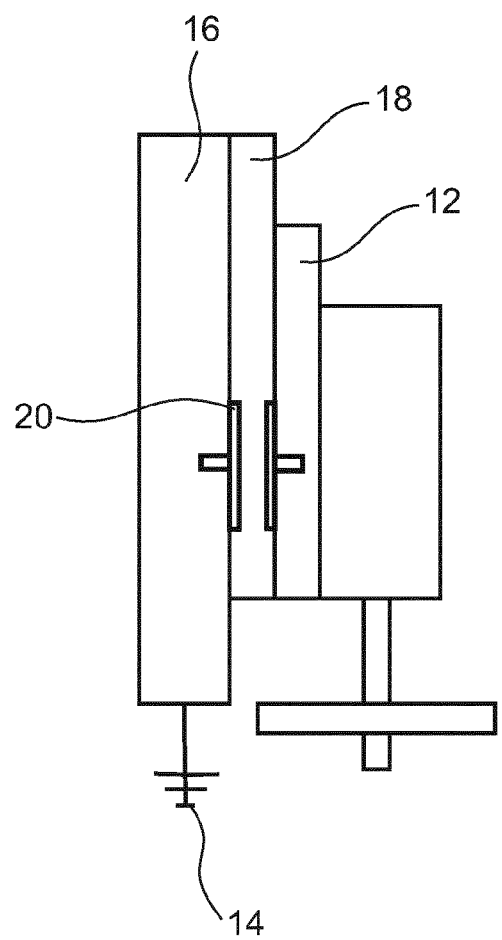
FIG. 1 shows a simplified schematic illustration of the origin of common-mode interference.
Figure 2:
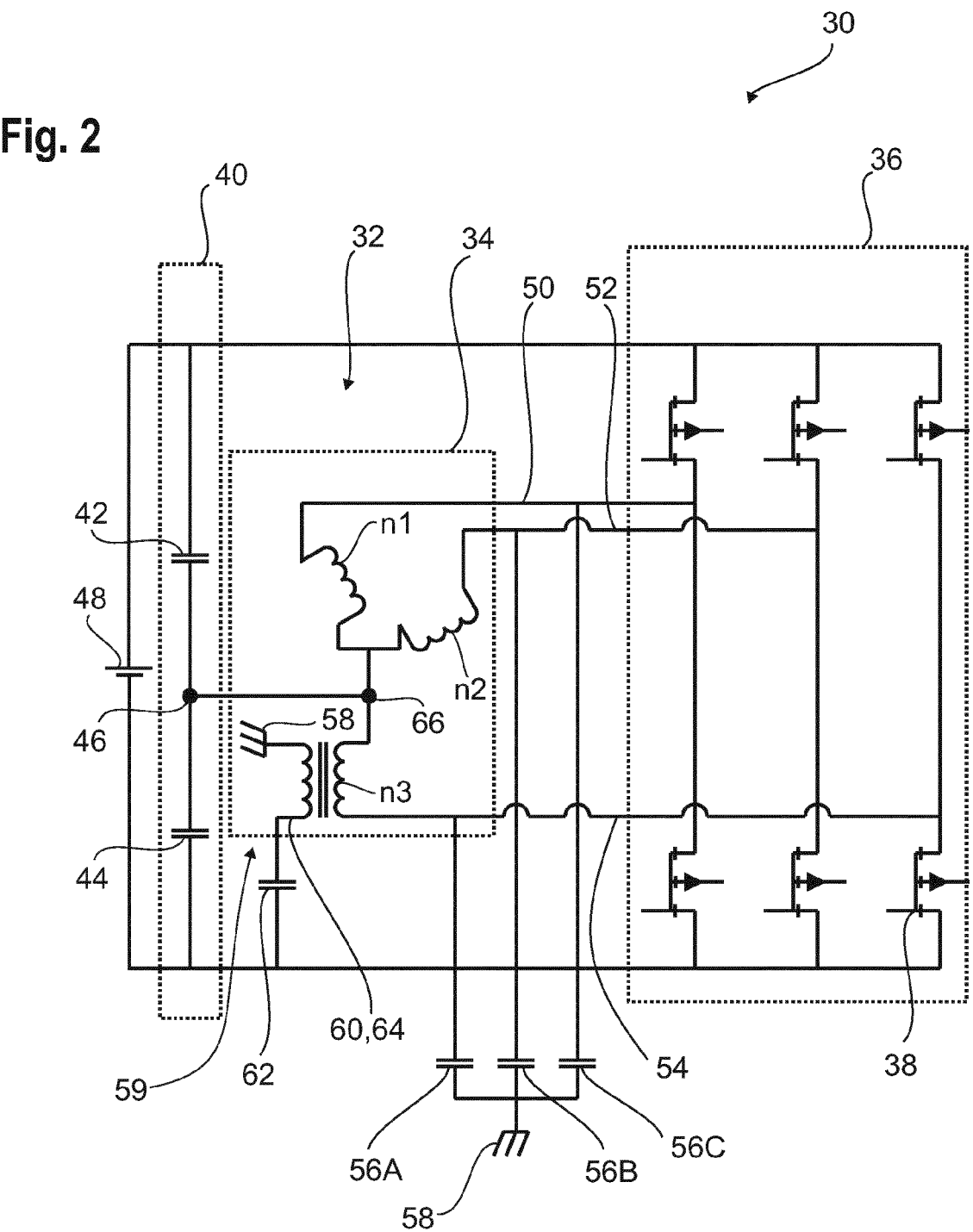
FIG. 2 shows a simplified schematic illustration of an electrical device according to one embodiment.

FIG. 2 shows a simplified schematic illustration of an electrical device 30 according to one embodiment.

A 3-phase electrical machine 32 for an at least partly electrically driven vehicle is shown. The electrical machine 32 is arranged in a housing 34. In particular, the rotor and the stator of the electrical machine 32 are arranged in a volume enclosed by the housing 34.

Furthermore, there is provision in the electrical machine 32 for a power converter 36, which is in the form of a B6 bridge in the present case.

In addition, there is an intermediate circuit capacitor 40 which is used as a buffer capacitor. In the present case, the intermediate circuit capacitor 40 comprises two capacitor elements 42, 44, between which a center tap 46 of the intermediate circuit capacitor 40 is formed.

The electrical machine 32 is coupled to a DC voltage source 48. The DC voltage source 48 can be a high-voltage battery of the vehicle. The power converter 36 is coupled between the positive and negative potentials of the DC voltage source 48.

In the present case, the electrical machine 32 is a three-phase electrical machine having the current phases n1, n2, n3. The current phases n1-n3 are in contact with stator windings which are electrically connected to intermediate taps of respective transistor pairs of the power converter 36 by way of supply lines 50, 52, 54.

The supply lines 50, 52, 54 and the stator windings of the current phases n1, n2, n3 are electrically insulated from the ground potential 58. However, the switching operations of the transistors 38 of the power converter 36 cause the potential differences relative to ground to vary. Common-mode interference, which is illustrated here in the form of parasitic capacitances 56A, 56B, 56C, is therefore induced. The common-mode interference originates regardless of whether positive or negative voltage potentials are applied to the stator windings and the supply lines 50, 52, 54.

In order to compensate for the common-mode interference, there is provision for compensation networks 59. A compensation network 59 comprises exclusively passive components. It is therefore also referred to as a passive compensation network 59. The compensation network 59 comprises at least one compensation winding 60 and one compensation capacitor 62.

The compensation winding 60 is arranged inside the housing 34 of the electrical machine 32. The compensation capacitor 62 is arranged outside the housing 34. The compensation capacitor 62 can also be arranged inside the housing 34, however. The compensation winding 60 and the compensation capacitor 62 are arranged in a series circuit.

The compensation network 59 is assigned to the current phase n3. The compensation winding 60 interacts with the stator winding of the current phase n3. In particular, the compensation winding 60 is formed together with the stator winding of the current phase n3 as a one-to-one transformer 64. This means that the stator winding of the current phase n3 and the compensation winding 60 have the same number of turns.

In addition, the compensation winding 60 is electrically connected to the ground potential 58.

The compensation winding 60 and the compensation capacitor 62 are designed in accordance with the following condition. The product of the number of turns of the compensation winding 60 and the capacitance of the compensation capacitor 62 is equal to the product of the number of turns of the assigned stator winding of the current phase n3 and the respective parasitic capacitance 56A. Since the numbers of turns of the compensation winding 60 and the stator winding of the current phase n3 are equal, the compensation capacitor 62 must thus have a capacitance that corresponds to that of the parasitic capacitance 56A. The parasitic capacitance can be determined in advance using a network simulation and an EMI (electromagnetic interference) receiver. The compensation capacitor 62 can then be designed as appropriate.

The current phases n1, n2, n3 of the electrical machine 32 are coupled at a star point 66. The star point 66 of the electrical machine 32 is electrically connected to the intermediate tap 46 of the intermediate circuit capacitor 40. The intermediate tap 46 can also be referred to as a center point tap since the capacitor elements 42, 44 have the same capacitances.

If the compensation winding 60 and the compensation capacitor 62 are of appropriate design, the common-mode interference can be easily compensated for. Forming the compensation winding 60 together with the stator winding of the current phase n3 as a one-to-one transformer 64 ensures that a phase shift of 180° is guaranteed when the winding directions are different. In addition, a particularly good coupling ratio can be achieved in the one-to-one transformer 64.

Without the compensation network 59, there would have to be provision for complex and expensive filter elements for the current phases in order to comply with the legal provisions on electromagnetic compatibility, which filter elements can be dispensed with in the present case.

For the sake of clarity, only one of the compensation networks 59 is shown in the present case. Generally, however, the number of compensation networks 59 present corresponds to the number of current phases n of the electrical machine 32. A compensation network 59 is then designed for each current phase in order to compensate for the respective common-mode interference. An n-phase electrical machine 32 thus has n corresponding one-to-one transformers 64. Each compensation network 59 is designed in accordance with the aforementioned conditions. The connection between the star point 66 and the intermediate tap 46 of the intermediate circuit capacitor ensures a balanced design.

Figure 3:
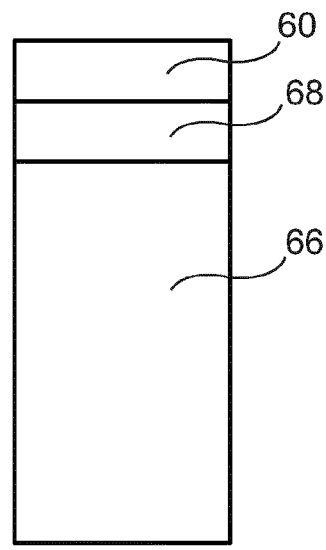
FIG. 3 shows a simplified schematic illustration of a compensation winding.

FIG. 3 shows a simplified schematic illustration of a compensation winding 60. The compensation winding 60 is formed directly on the stator winding 66 as an additional winding. Only electrical insulation 68 is provided between the windings. This provides a good coupling ratio between the compensation winding 60 and the stator winding 66.

Although the invention has been illustrated and described with regard to one or more implementations, reading and understanding this description and the appended drawings will enable those skilled in the art to identify equivalent changes and modifications. Moreover, although a particular feature of the disclosure may have been disclosed with regard to only one of several implementations, this feature may be combined with one or more other features of the other implementations.

The invention claimed is:

1. An electrical device for compensating for common-mode interference in an electrical machine, the device comprising:
at least one compensation network with at least one compensation winding and at least one compensation capacitor, the compensation winding and the compensation capacitor being arranged in a series circuit, and the at least one compensation winding interacting with at least one stator winding of the electrical machine so that a compensation current counteracting the common-mode interference is generated,
wherein the at least one compensation winding comprises a number of turns that corresponds to a number of turns of the at least one stator winding.

2. The electrical device according to claim 1, wherein the compensation current has a phase shift of 180° with respect to the common-mode interference.

3. The electrical device according to claim 1, wherein the at least one compensation winding is formed together with the at least one stator winding in a manner of a one-to-one transformer.

4. The electrical device according to claim 1, wherein the at least one compensation winding is formed as an additional winding on the at least one stator winding.

5. The electrical device according to claim 1, wherein the at least one compensation capacitor is configured to act as a high-pass filter.

6. The electrical device according to claim 1, wherein the at least one compensation capacitor and the at least one compensation winding are configured in such a way that a product of the capacitance of the compensation capacitor and an inductance of the compensation winding is equal to a product of an inductance of the at least one stator winding and a parasitic capacitance, the parasitic capacitance being a cause of the common-mode interference for which there is compensation.

7. A system comprising:
electrical devices for an n-phase electrical machine, the electrical machine comprising the at least one stator winding assigned to a respective current phase; and
at least n electrical devices according to claim 1,
wherein the at least one stator winding assigned to a respective current phase interacts with each of the n electrical devices.

8. The system according to claim 7, comprising:
an intermediate circuit capacitor for the electrical machine, the current phases of the electrical machine being coupled at a star point, and the star point being electrically coupled to a center point of the intermediate circuit capacitor.

9. The system according to claim 7, wherein the electrical machine is a 3m-phase electrical machine, wherein m is a natural number greater than 0.

10. An electrical machine for an at least partly electrically driven vehicle comprising the system according to claim 7.

11. An electrical device for compensating for common-mode interference in an electrical machine, the device comprising:
at least one compensation network with at least one compensation winding and at least one compensation capacitor, the compensation winding and the compensation capacitor being arranged in a series circuit, and the at least one compensation winding interacting with at least one stator winding of the electrical machine so that a compensation current counteracting the common-mode interference is generated,
wherein the at least one compensation winding is formed together with the at least one stator winding in a manner of a one-to-one transformer.

12. The electrical device according to claim 11, wherein the compensation current has a phase shift of 180° with respect to the common-mode interference.

13. The electrical device according to claim 11, wherein the at least one compensation winding is formed as an additional winding on the at least one stator winding.

14. The electrical device according to claim 11, wherein the at least one compensation capacitor is configured to act as a high-pass filter.

15. The electrical device according to claim 11, wherein the at least one compensation capacitor and the at least one compensation winding are configured in such a way that a product of the capacitance of the compensation capacitor and an inductance of the compensation winding is equal to a product of an inductance of the at least one stator winding and a parasitic capacitance, the parasitic capacitance being a cause of the common-mode interference for which there is compensation.

16. A system comprising:
electrical devices for an n-phase electrical machine, the electrical machine comprising the at least one stator winding assigned to a respective current phase; and
at least n electrical devices according to claim 11,
wherein the at least one stator winding assigned to a respective current phase interacts with each of the n electrical devices.

17. The system according to claim 16, comprising:
an intermediate circuit capacitor for the electrical machine, the current phases of the electrical machine being coupled at a star point, and the star point being electrically coupled to a center point of the intermediate circuit capacitor.

18. The system according to claim 16, wherein the electrical machine is a 3m-phase electrical machine, wherein m is a natural number greater than 0.

* * * * *